United States Patent
Pereira et al.

(10) Patent No.: US 6,650,537 B2
(45) Date of Patent: Nov. 18, 2003

(54) LOW PROFILE DC DISTRIBUTION MODULE FOR A POWER SUPPLY UNIT

(75) Inventors: Robert A. Pereira, Spring, TX (US); Paily T. Varghese, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 60 days.

(21) Appl. No.: 09/999,575

(22) Filed: Oct. 31, 2001

(65) Prior Publication Data

US 2003/0081441 A1 May 1, 2003

(51) Int. Cl.$^7$ ................................................ H05K 5/00
(52) U.S. Cl. ...................................................... 361/687
(58) Field of Search ................................ 363/141, 144; 361/601, 679, 683, 687, 688, 690, 692, 704, 705, 707, 712, 713, 715, 728, 730, 760

(56) References Cited

U.S. PATENT DOCUMENTS

| | | | | |
|---|---|---|---|---|
| 3,828,301 A | * | 8/1974 | Neidecker | 339/75 |
| 6,290,514 B1 | * | 9/2001 | McHugh et al. | 439/108 |
| 6,482,016 B1 | * | 11/2002 | McHugh et al. | 439/79 |

* cited by examiner

Primary Examiner—Matthew V. Nguyen

(57) ABSTRACT

A DC distribution module for a power supply unit is modular and facilitates thermal cooling of the unit. The power supply unit preferably includes a housing in which one or more power supply modules and the DC distribution module can be inserted. The DC distribution module preferably comprises two power conductors laminated and bonded to a ground conductor. The DC distribution module is relatively thin compared to the power supplies inserted into the power supply unit. By being relatively thin, the DC distribution module, which may carry substantial amounts of current, does not substantially interfere with air movement through the power supply unit for thermal cooling purposes.

21 Claims, 4 Drawing Sheets

LOW PROFILE DC DISTRIBUTION MODULE FOR A POWER SUPPLY UNIT

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates generally to a power supply unit for a plurality of computer equipment (e.g., a rack of computers). More particularly, the invention relates to a power supply unit for a rack of computers that has a low profile direct current ("DC") module which facilitates servicing and maintaining the power supply unit and assists in maximizing air flow through the unit.

2. Background of the Invention

Computer equipment is often deployed in a "rack." Generally, a rack is a structure in which one or more computers, electronic switches, and other such equipment is installed. Racks are particularly useful to organizations that require a great deal of computing capability, such as Internet Service Providers ("ISPs"), Application Service Providers ("ASPs"), various corporations with relatively large internal networks and the like.

Also, depending on the power load required, power supplies generally generate a great deal of heat that must be removed. The heat generated is generally a result of the relatively larger power consumption demands for a rack of server equipment. Heat removal is typically performed by blowing air over the hot components and out of the unit, thereby transferring heat from the hot component to the surrounding environment. As computer equipment becomes smaller and smaller, more equipment can be housed in a rack which, in turn, increases the electrical load on the power supply. As power supplies are designed that generate more electrical current, the power supplies become hotter. Racks of servers typically have a large number of relatively large data and power cables that often block air flow. Thus, current computer racks have a significant thermal problem that must be addressed. Anything that can be done to provide a better heat removal capability is highly desirable.

BRIEF SUMMARY OF THE INVENTION

The problems noted above are solved in large part by a DC distribution module for a power supply unit. The power supply unit preferably includes a housing in which one or more power supply modules and the DC distribution module can be inserted. The DC distribution module preferably comprises two power conductors laminated and bonded to a ground conductor. The DC distribution module is relatively thin compared to the power supplies inserted into the power supply unit. By being relatively thin, the DC distribution module, which may carry substantial amounts of current, does not substantially interfere with air movement through the power supply unit for thermal cooling purposes.

These and other advantages will become apparent upon reviewing the following description in relation to the accompanying drawings.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component and sub-components by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either a direct or indirect electrical connection. Thus, if a first device couples to a second device, that connection may be through a direct electrical connection, or through an indirect electrical connection via other devices and connections. To the extent that any term is not specially defined in this specification, the intent is that the term is to be given its plain and ordinary meaning.

DETAILED DESCRIPTION OF THE PREFERRED EMBODIMENTS

Figure 1:
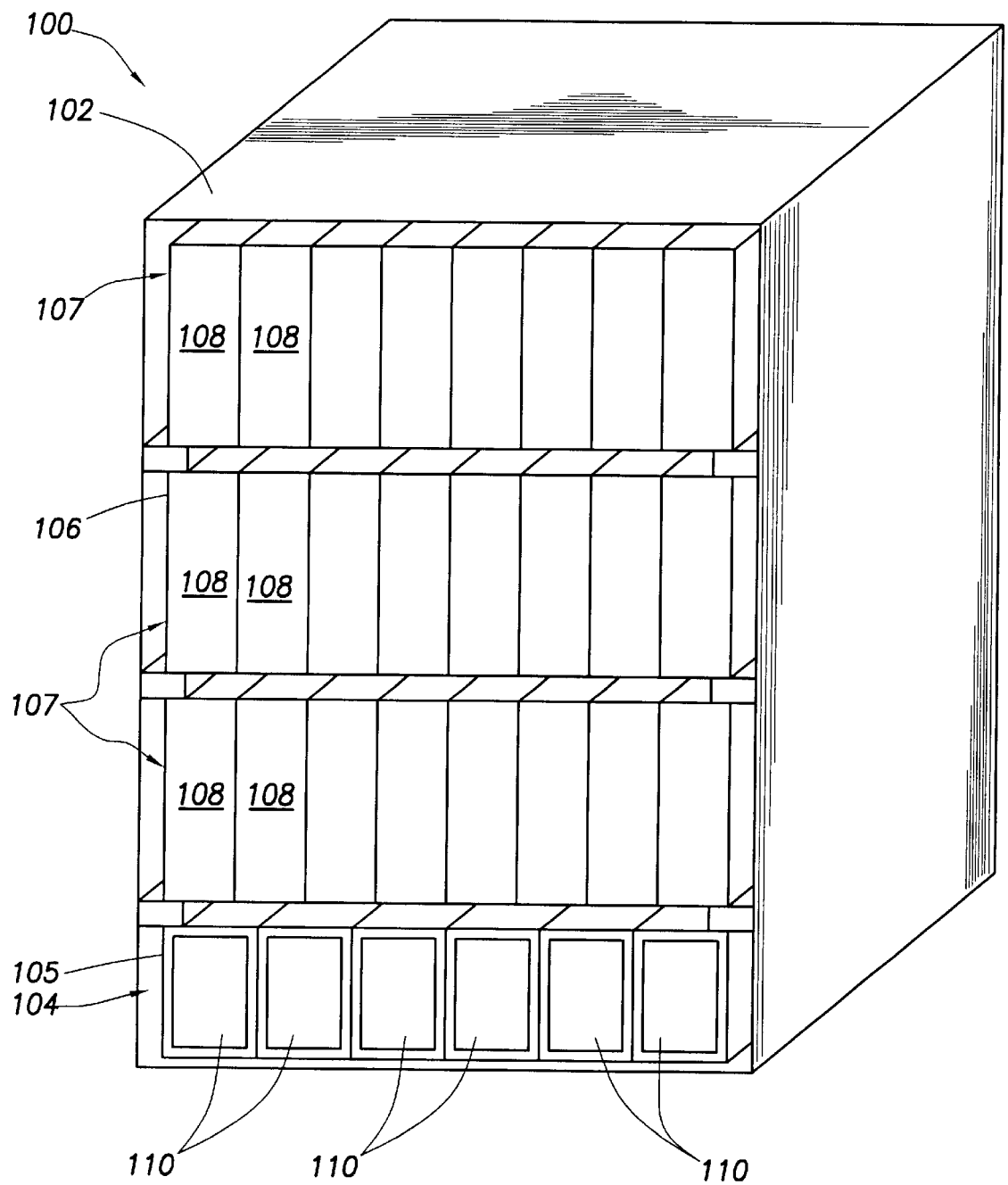
FIG. 1 shows a front view of rack including a power supply unit constructed in accordance with a preferred embodiment of the invention.

Referring now to FIG. 1, computer system 100, constructed in accordance with a preferred embodiment of the invention, comprises a support structure 102 (e.g., a rack) capable of housing and interconnecting various items of electrical equipment. The electrical equipment may include one or more server units 107 each comprising a housing 106 capable of receiving one or more server computers 108. In the exemplary embodiment shown in FIG. 1, each server housing 106 can receive up to eight servers 108. Rack 102 also includes a power supply unit 104. The power supply unit 104 preferably comprises a housing 105 capable of receiving one or more power supply modules 110. Similar to the server housing 106, the power supply housing 105 preferably is capable of accommodating as many as six power supplies. Of course, it should be appreciated that the rack 102 and housings 105, 106 can be modified to accommodate any number of servers 108 and power supply modules 110. Also, the rack can be modified to accommodate any desired number of power supply and server housings 105, 106.

Preferably, the power supply and server housings 105, 106 mount inside the rack 102 using various screws or other types of attachment mechanisms. The servers 108 and power supply modules 110 slide into their respective housings either before or after the housings are attached to the rack 102. The servers and power supply modules preferably include blind mating connectors at their distal end (not specifically shown in FIG. 1) that permit the servers and power supply modules to be easily removed and replaced.

Figure 2:
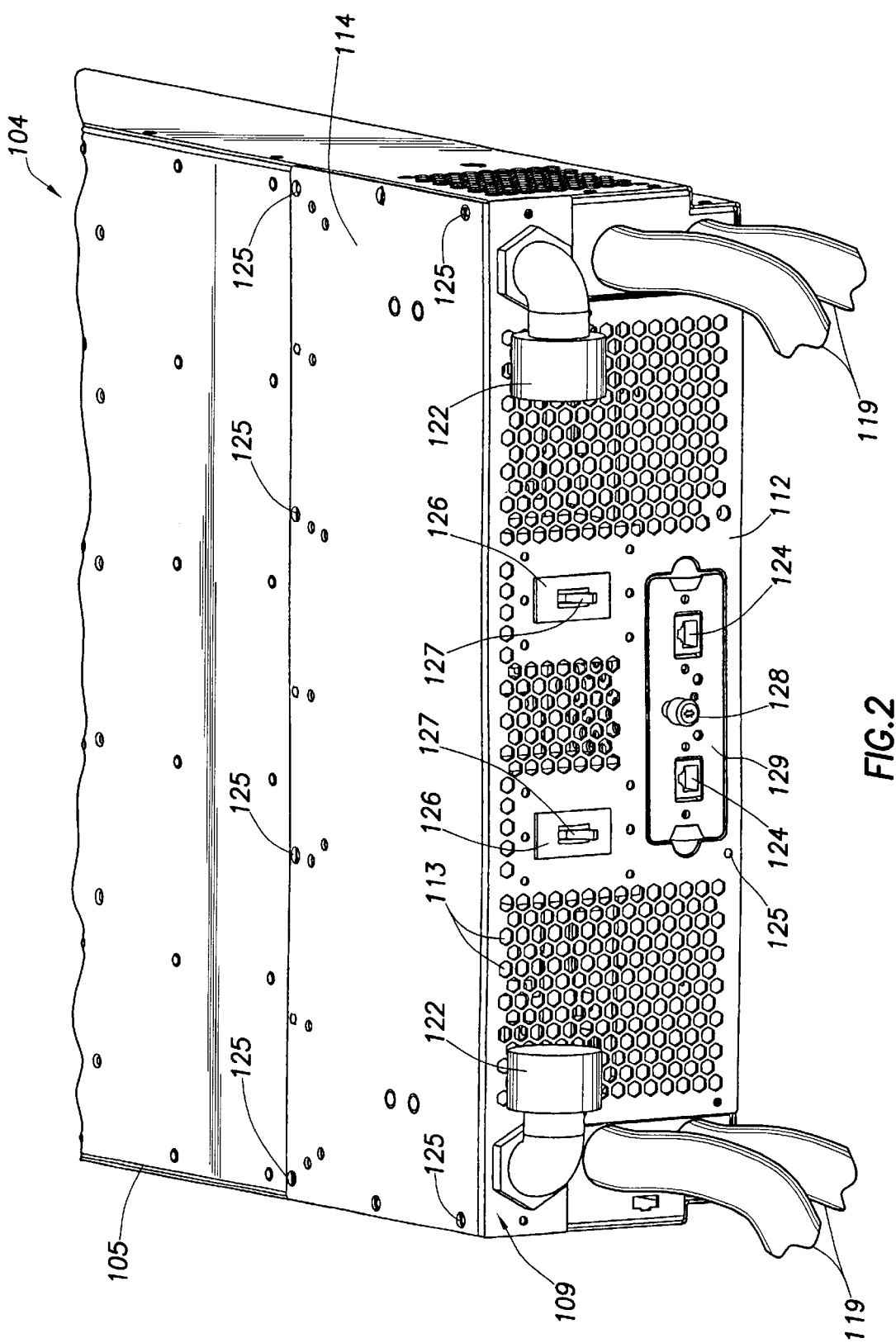
FIG. 2 shows a rear view of the power supply unit of FIG. 1.

Turning now to FIG. 2, the rear portion of the power supply unit 104 is shown apart from the rack 102. An AC input section 109 is shown attached to the back of the power supply unit 104. The AC input section 109 preferably includes a back 112 and top 114. The back 112 and top 114 include a plurality of holes through which screws 125 (or other types of attachment mechanisms) are inserted to mate the AC input section 109 to the housing 105. The back 112 preferably is perforated with perforations 113 as shown to permit air flow around and through the power supplies 110 to thereby assist in removing heat from the power supply modules 110. A pair of circuit breakers 126 also are shown protruding through the back 112 of the AC input section 109. As is well known, circuit breakers open a circuit when the level of current in the circuit exceeds a predetermined threshold. The breakers 126 can be reset by toggling the switches 127 protruding through back 112.

As shown in FIG. 2, preferably two alternating current ("AC") cable adapters 122 preferably are provided to receive 200–240 VAC power via cables (not shown) to the power supply unit 104 and four cables 119 provide direct current ("DC") voltage to various equipment in rack 102 such as servers 108. Two AC power feeds may be included for redundancy or other purposes. The AC input section 109 generally includes circuit breakers (as noted above), wiring and connectors which provide the AC input power to the individual power supply modules 110 within the housing 105.

A communication board 129 may also insert through the back 112 of the AC input section 109 and be retained by threaded thumb screw 128 or other suitable means. The communication board 129 may provide digital communications between the power supplies contained within the power supply unit 104 and other components in the rack 102 for control and status purposes. Communication board 129 preferably includes two digital communication ports 124 by which other equipment in the rack can communicate with the power supplies.

Figure 3:
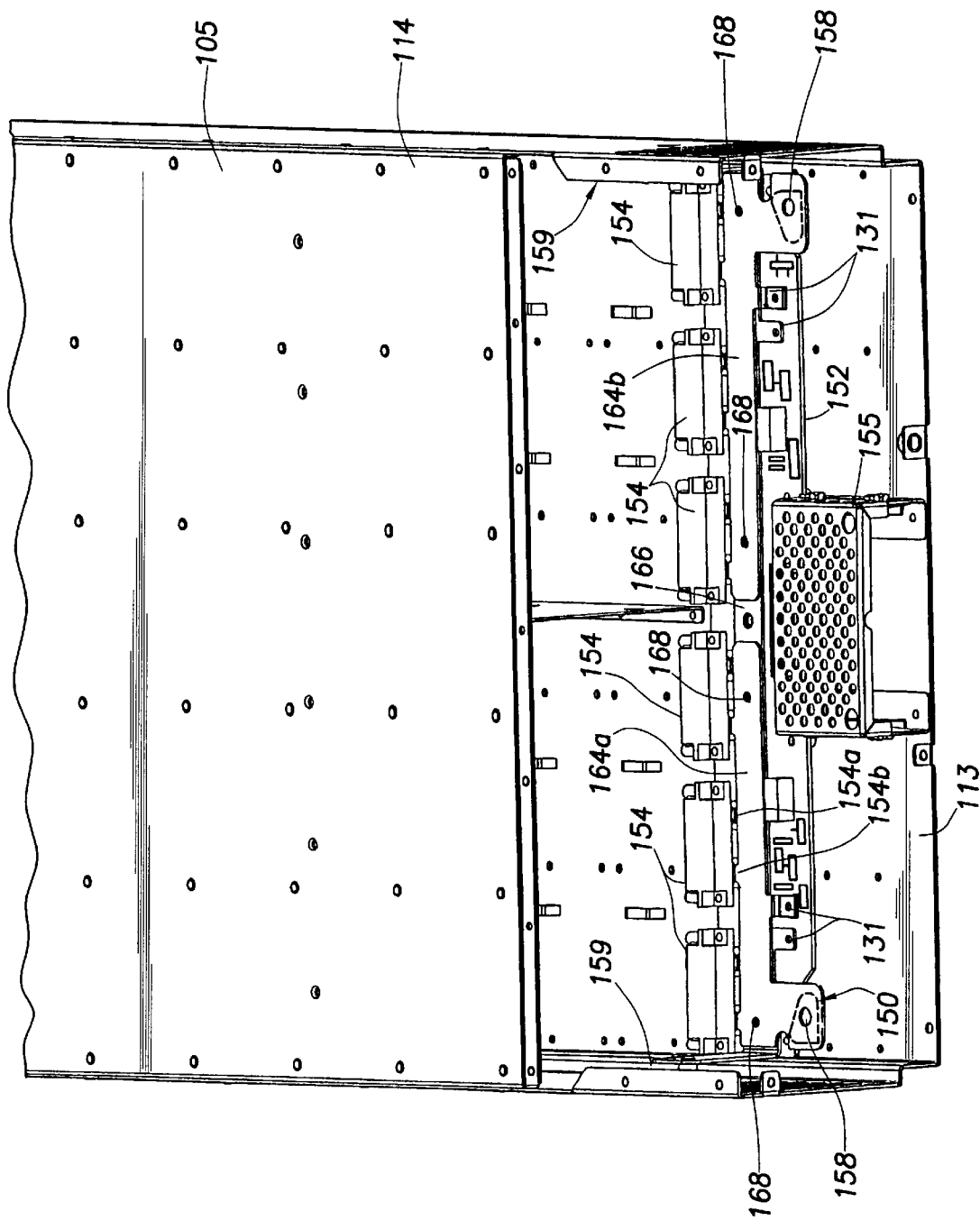
FIG. 3 shows a low profile DC distribution module in place in the power supply unit of FIG. 1.

Referring now to FIG. 3, a rear view of power supply unit 104 is shown without the AC input section 109 in place and without power supplies 110. As shown, the power supply housing 105 includes a DC distribution module 150 mounted to a bottom surface 113 of the housing. In accordance with the preferred embodiment, the DC distribution module 150 may be mounted to the housing 105 via fasteners 168 and standoffs (not specifically shown in FIG. 3) and a control logic circuit board 152. The control logic board 152 contains electronics mounted on a printed circuit board that performs the function of providing digital communication between the power supplies 110 contained within the power supply unit 104 and other components in the rack 102. The function performed by control logic board 152 may have little or nothing to do with the function performed by the DC distribution module 150, but is mounted to the housing 105 with the DC distribution module 150 as shown to minimize the number of fasteners needed to mount the hardware in the housing 105 and the complexity of the mounting infrastructure. If desired, the control logic board 152 may be mounted completely separate from the DC distribution module 150 or be omitted altogether. Preferably, the DC operating voltage needed to power the communication board 152 is taken from the DC distribution module 150 via contact points 131 as shown. Although generally unrelated to the DC distribution module 150, card guide 155 is provided as shown to receive communication board 129 (FIG. 2) and efficiently permit it to be connected to control logic board 152 via a blind mating connector (not shown).

Figure 4:
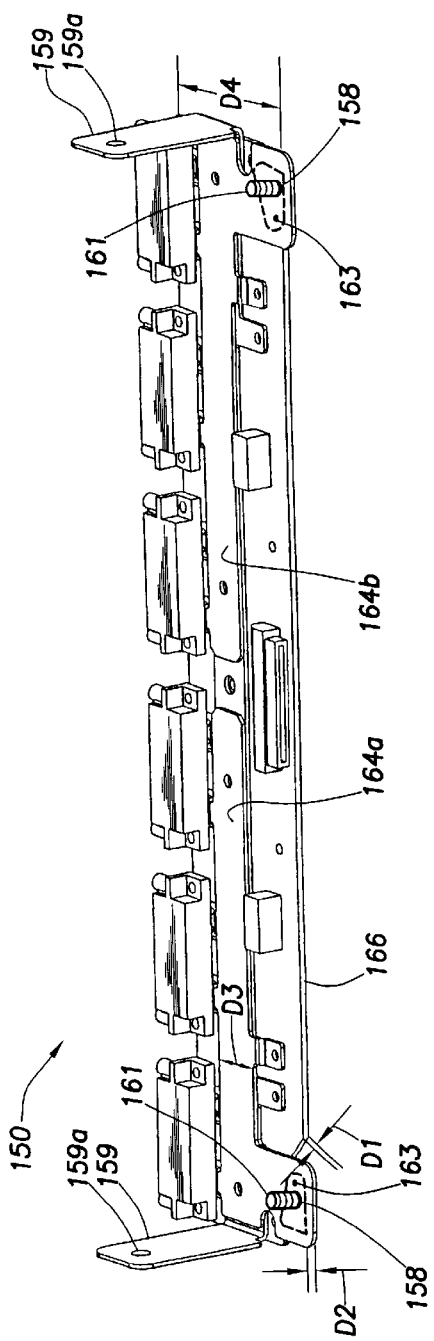
FIG. 4 shows a close up view of the DC distribution module.

The preferred embodiment of the DC distribution module 150 generally comprises a relatively thin (i.e., low profile) DC power distribution conductor that channels the DC output voltage from the various power supplies 110 to contact points 158 and 159 to which two sets of cables 119 attach to provided DC power to various electrical equipment in rack 102. Contact points 159 and the construction of the module 150 are better shown FIG. 4. Referring briefly to FIG. 4, a pair of electrically conductive threaded studs 161 are attached to contact points 158. These studs preferably are welded to stainless steel plates which, in turn, are riveted to the bus bar at rivet points 163. Stainless steel plates 158 preferably are attached to the bottom side of the module 150. This type of construction permits the power cables 119 (FIG. 2) to be connected via a flat washer, lock washer and nut. The threaded studs preferably are formed integral with the bus bar thereby reducing the risk of loose parts and making the assembly process very easy and fast.

The DC distribution module 150 generally comprises three components—a ground conductor 166 and two "power" conductors 164a and 164b. In the preferred, the power conductors 164a, 164b conduct 48 VDC, although the voltage can be varied as desired. The power and return conductors 164a, 164b preferably are formed in an L-shape and are generally non-circular in cross section. The conductors 164a, 164b and 166 preferably are made from thin copper stock and are laminated with a suitable insulation to electrically isolate the three conductors from each other. Further, the power conductors are mechanically attached to the ground conductor using a suitable bonding agent or through any other suitable means such as screws, bolts, clamps, and the like. Contacts 159 preferably comprise electrically conductive, vertical tabs formed at the edges of the module 150 (or attached thereto) and include a mounting hole 159a for attachment to the sides of the housing 105, to ground the housing, and to an electrical cable 119.

Referring again to FIG. 3, each power supply 110 provides its DC output voltage to the DC distribution module 150 via blind-mating connectors 154. One terminal 154a from each connector 154 is attached to the ground conductor 166 and the other terminal 154b is attached to a power conductor 164a, 164b. As shown in FIG. 3, the three left most power supplies connect to power conductor 164a, while the three right most power supplies connect to power conductor 164b. In this manner, power supply unit 104 provides redundant DC power feeds to other equipment in rack 102. Preferably, the power supplies 110 are designed so that three power supplies can provide enough DC power to operate the equipment in the rack, at least at a minimally tolerable level.

Figure 5:
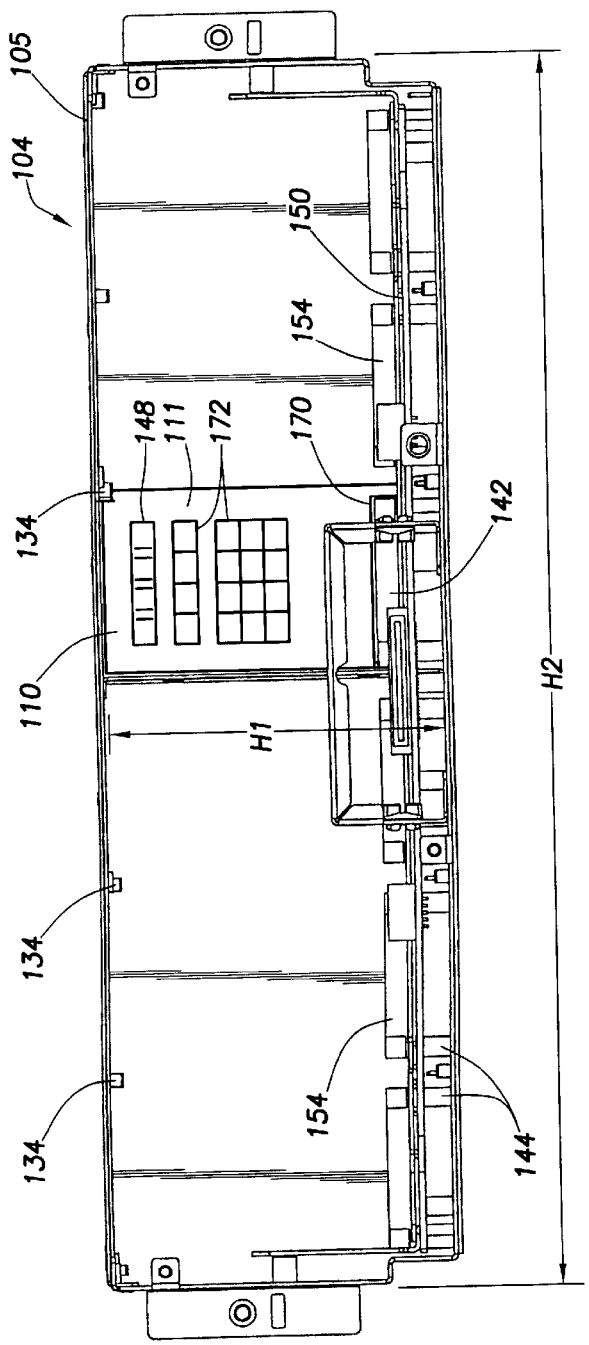
FIG. 5 shows a rear view of the power supply unit's housing with a rear view of the low profile DC module.

The DC distribution module 150 described and shown herein has the following benefit of being helpful in thermal cooling. To this end, the DC distribution module 150 preferably is low profile which permits air flow through the power supply unit 104 thereby assisting in thermal cooling. The low profile nature of DC distribution module 150 is best illustrated with respect to FIGS. 4 and 5. FIG. 4 shows an isolated view of the DC distribution module. Referring to FIG. 5, a rear view of power supply unit 104 is shown without the AC input section 109 in place. A single power supply 110 is shown in place in the power supply unit 104. Guide rails 134 permit each power supply 110 to be slid into place in housing 105. Each power supply 110 includes a pair of blind mating connectors 148 and 170 that mate with a corresponding connector on the AC input section 109 and a corresponding connector 154 is mounted on (or interfaces with) the DC distribution module 150 and on the control logic board 152. Each power supply 110 preferably includes a fan (not specifically shown) to blow air out the back of the supply (via exhaust ports 172 in rear surface 111 of the supply 110), over and/or under the DC distribution module 150 and through the perforations in the back 112 of the power supply unit (FIG. 2). Conventional bus bar structures mount vertically (perpendicularly) to the associated control logic board and thus would block air flow from the power supplies, thereby making it more difficult to cool the unit. Being mounted horizontally and close to the surface of the control logic board 152, DC distribution module 150 permits warm exhaust air from the power supplies to move more efficiently out of the power unit 104 greatly assisting in cooling the unit.

In the context of this disclosure, "low profile" means that the total height of the DC distribution module 150 is relatively small compared to the height of a power supply 110 so that efficient air movement can occur to effectively cool the power supply unit 104. That the DC distribution module 150 is relatively small compared to the height of a power supply is best seen in FIG. 5 where it can be observed that the DC distribution module 150 does not block the exhaust ports 172.

To this end, the DC distribution module 150 is relatively thin. To have sufficient current carrying capacity, however, the module 150 is relatively wide compared to its height. These dimensional concepts are better understood using the definitions below.

Various dimensions are identified in FIGS. 4 and 5 and summarized in table I below.

TABLE I

Dimensions of DC Distribution Module.

| Dimension | Explanation |
| --- | --- |
| D1 | Thickness of ground conductor 166 |
| D2 | Thickness of each power conductor 164a, 164b |
| D3 | Width of each power conductor 164a, 164b |
| D4 | Width of the ground conductor 166 |
| H1 | Thickness of power supply 110 |
| H2 | Width of housing 105 |

The low profile nature of the DC distribution module 150 can be characterized in a number of different ways, as listed below. It should be understood that the following numerical characterizations are illustrative only and should not limit the claims, unless other stated. The preferred embodiment of the low profile DC distribution module can be characterized by any one or more of the following:

The thickness of each power conductor 164a, 164b is less than the width of each power conductor (i.e., D2 is less than D3).

The thickness of each power conductor 164a, 164b is less than 10% the width of each power conductor (i.e., D2 is less than 10% of D3).

The thickness of the ground conductor 166 is less than the width of the ground conductor (i.e., D1 is less than D4).

The thickness of the ground conductor 166 is less than 10% of the width of the ground conductor (i.e., D1 is less than 10% of D4).

The thickness of the DC distribution module 150 is less than the width of the DC distribution module (i.e., D1+D2 is less than D4).

The thickness of the DC distribution module 150 is less than 10% of the width of the DC distribution module (i.e., D1+D2 is less than 10% of D4).

Because the DC distribution module 150 is relatively low profile compared to the power supplies 110, the width of the conductors (D3 and D4) must be larger than the thickness of the conductors (D1 and D2) to achieve sufficient current carrying capacity.

As best seen in FIGS. 3 and 4, DC distribution module 150 is relatively thin compared to its width. As explained above, the low profile nature and mounting method of the DC distribution module 150 facilitates cooling the power supply unit 104. Due to the low profile cross section and mounting method of the assembly, the DC distribution module 150 does not extend above the height of the blind mating connectors 154. This permits sufficient room for air to pass from the exhaust ports 172 in the power supplies over the DC distribution module 150 to help cool the unit. Conventional DC distribution mechanisms have taken the form of electrical cable assemblies or conductive traces on printed wiring boards. For such distribution mechanisms to have sufficient current carrying capacity, the relatively large in cross section of the cables would interfere with air movement through the unit. Similarly, the cross section of the traces in a printed wiring board would be too thick to be practical. By making the distribution module in the preferred embodiment relatively wide and flat, the current carrying capacity is preserved with the benefit of increased air flow, thus allowing more efficient thermal cooling.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A DC distribution module for a power supply unit that receives electrical power from a power supply, comprising:
   an insulated ground conductor; and
   at least one insulated power conductor adhesively attached to said ground conductor, wherein the at least one power conductor has a non-circular cross section; and
   wherein said DC distribution module is adapted to be mounted in the power supply unit.

2. The DC distribution module of claim 1 comprising two insulated power conductors adhesively attached to said insulated ground conductor.

3. The DC distribution module of claim 1 wherein said ground and said at least one power conductors are laminated and coated with insulation.

4. The DC distribution module of claim 1 wherein the at least one power conductor has a thickness that is smaller than its width.

5. The DC distribution module of claim 1 wherein the at least one power conductor has a thickness that is less than 10% of its width.

6. The DC distribution module of claim 1 wherein the combined thickness of the at least one power conductor and the ground conductor is less than the width of the DC distribution module.

7. The DC distribution module of claim 1 wherein the combined thickness of the at least one power conductor and the ground conductor is less than 10% of the width of the DC distribution module.

8. The DC distribution module of claim 1 wherein said at least one power conductor defines an attachment point for connection to a power cable.

9. The DC distribution module of claim 1 further including at least one threaded electrically conductive stud attached to said at least one power conductor, the at least one stud providing a connection point for at least one power cable.

10. The DC distribution module of claim 9 wherein said at least one stud is riveted to said at least one power conductor.

11. A power supply unit that produces voltage for use by electrical equipment, comprising:

a housing;

a power supply that fits into said housing;

a DC distribution module attached to said housing and electrically connected to said power supply, said DC distribution module including at least one power conductor attached to a ground conductor, wherein the at least one power conductor has a non-circular cross section.

12. The power supply unit of claim 11 wherein said DC distribution module comprises two power conductors attached to said ground conductor.

13. The power supply unit of claim 11 wherein said ground and power conductors are coated with laminate.

14. The power supply unit of claim 11 wherein the at least one power conductor has a thickness that is smaller than its width.

15. The power supply unit of claim 11 wherein the at least one power conductor has a thickness that is less than 10% of its width.

16. The power supply unit of claim 11 wherein the combined thickness of the at least one power conductor and the ground conductor is less than the width of the DC distribution module.

17. The power supply unit of claim 11 wherein the combined thickness of the at least one power conductor and the ground conductor is less than 10% of the width of the DC distribution module.

18. The power supply unit of claim 11 wherein said at least one power conductor defines an attachment point for connection to a power cable.

19. The power supply unit of claim 11 wherein said at least one power conductor is bonded to said ground conductor.

20. A DC distribution module for a power supply unit that receives electrical power from a power supply, comprising:

a ground conductor; and two power conductors formed in an L-shape, each power conductor separately bonded to said ground conductor, wherein said power conductors and said ground conductors have a non-circular cross section and the thickness of the combined ground and power conductors is less than 10% of the width of the DC distribution module.

21. The DC distribution module of claim 20 further including a pair of threaded electrically conductive studs attached to said power conductors to which a pair of power cables connect.

* * * * *